Oct. 30, 1951     E. A. ARP     2,573,532
SELF-ALIGNING BEARING

Filed Aug. 16, 1948     3 Sheets—Sheet 1

INVENTOR
EWALD A. ARP
BY G. H. Braddock
ATTORNEY

Oct. 30, 1951 E. A. ARP 2,573,532
SELF-ALIGNING BEARING

Filed Aug. 16, 1948 3 Sheets-Sheet 2

INVENTOR
EWALD A. ARP
BY G. H. Braddock
ATTORNEY

Oct. 30, 1951     E. A. ARP     2,573,532
SELF-ALIGNING BEARING

Filed Aug. 16, 1948     3 Sheets—Sheet 3

INVENTOR
EWALD A. ARP
BY *J. H. Braddock*
ATTORNEY

Patented Oct. 30, 1951

2,573,532

UNITED STATES PATENT OFFICE 2,573,532

SELF-ALIGNING BEARING

Ewald A. Arp, Minneapolis, Minn., assignor to Tobin-Arp Manufacturing Company, Minneapolis, Minn., a corporation of Minnesota Application August 16, 1948, Serial No. 44,442

7 Claims. (Cl. 308—72)

This invention relates to a self alining bearing.

An object of the invention is to provide a self alining bearing of simple, practical, efficient, new and improved construction.

A further object is to provide a self alining bearing wherein will be incorporated desirable and improved features and characteristics novel both as individual entities of the self alining bearing and in combination with each other.

And a further object is to provide a self alining bearing of construction and operative in the manner as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification,

Figure 1:
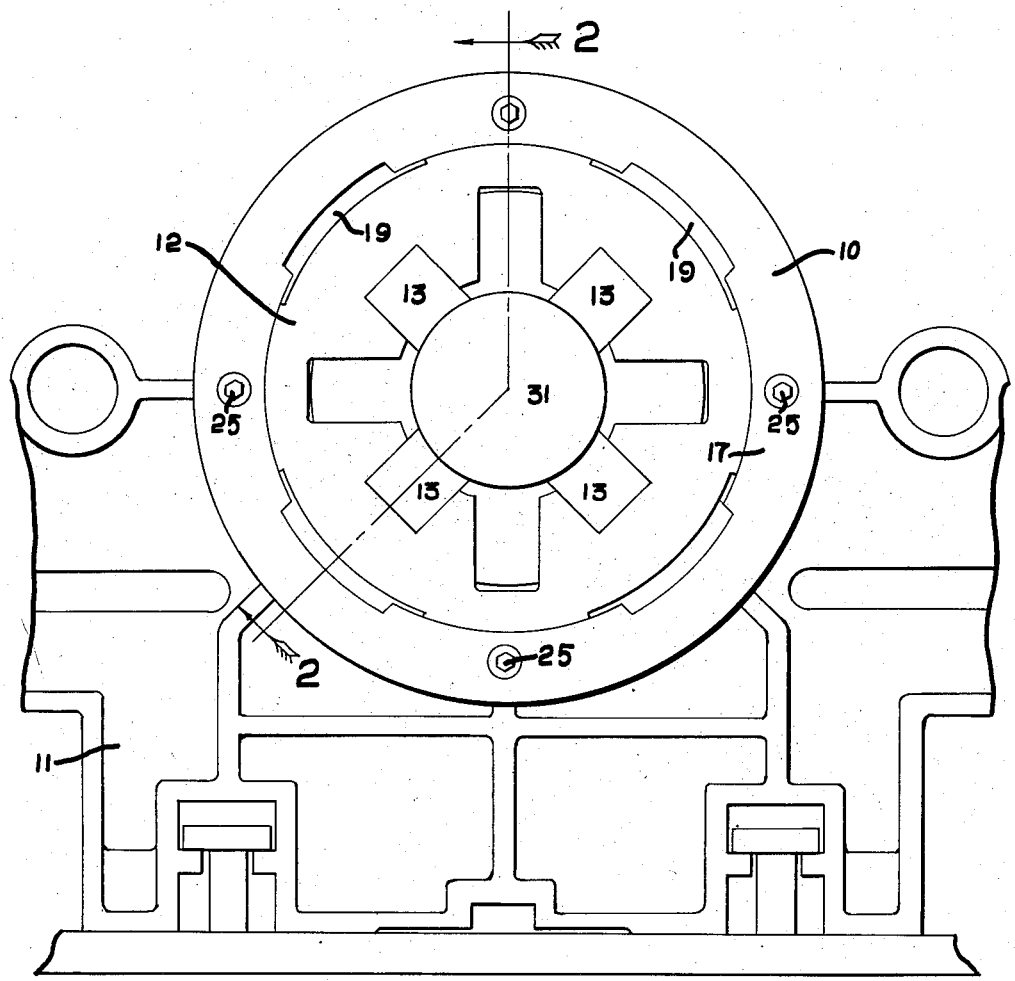
Fig. 1 is an elevational view of a self alining bearing made according to the invention.

Speaking generally, the self alining bearing which the invention presents includes a stationary housing 10 integrally or rigidly supported, in any suitable and convenient manner, upon a frame 11 itself rigidly supported, a cage 12 within the stationary housing 10, a plurality of blocks, four as disclosed, each denoted 13, within the cage, a retainer ring 14 for the cage, a lock nut 15 for the retainer ring, and a take-up ring 16 for the blocks 13.

Figure 2:
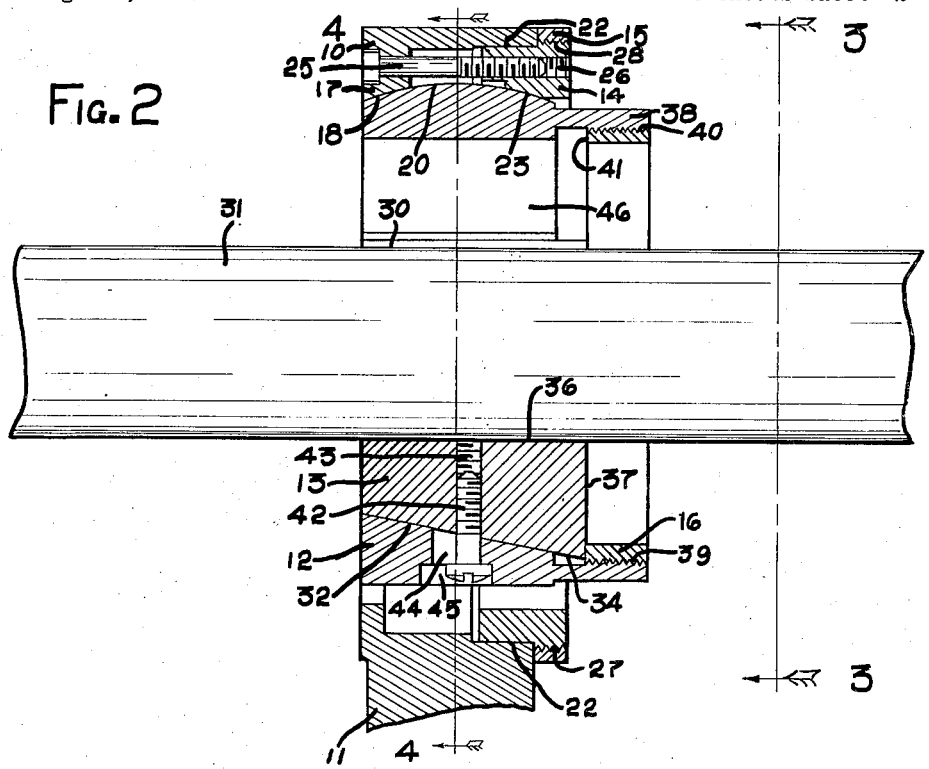
Fig. 2 is a sectional view, taken on line 2—2 in Fig. 1.
Figure 3:
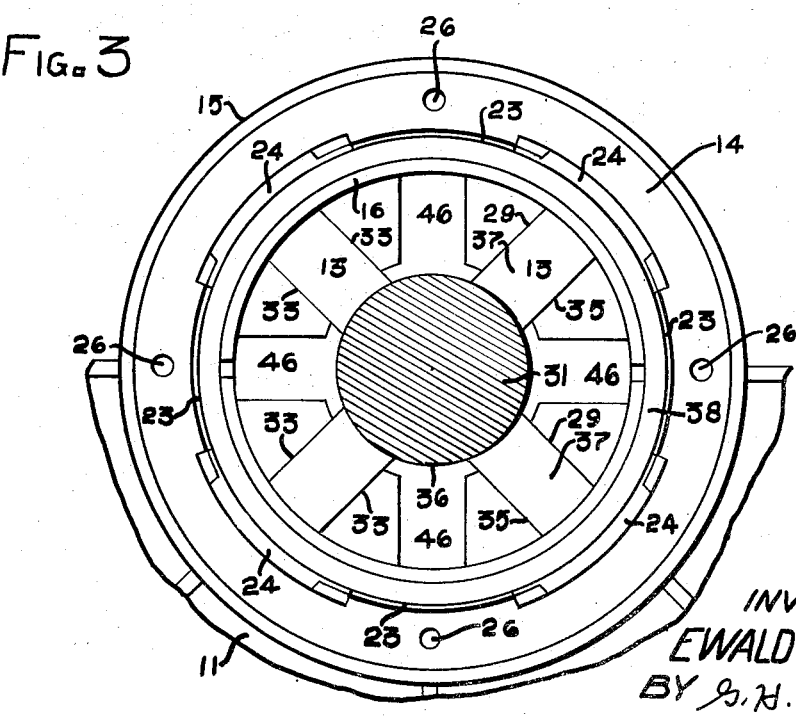
Fig. 3 is a sectional view, taken as on line 3—3 in Fig. 2.
Figure 4:
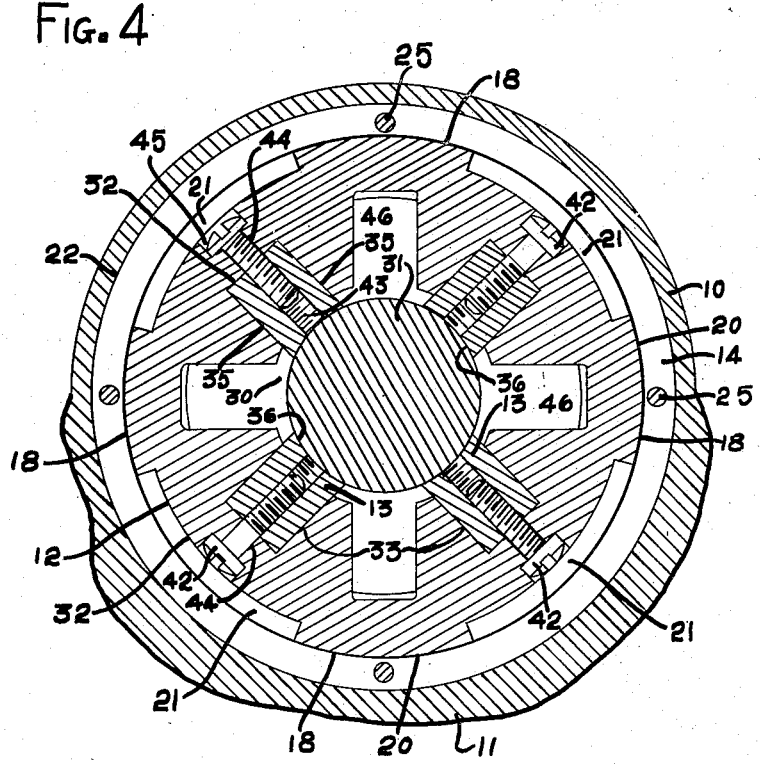
Fig. 4 is a sectional view, taken as on line 4—4 in Fig. 2.
Figure 5:
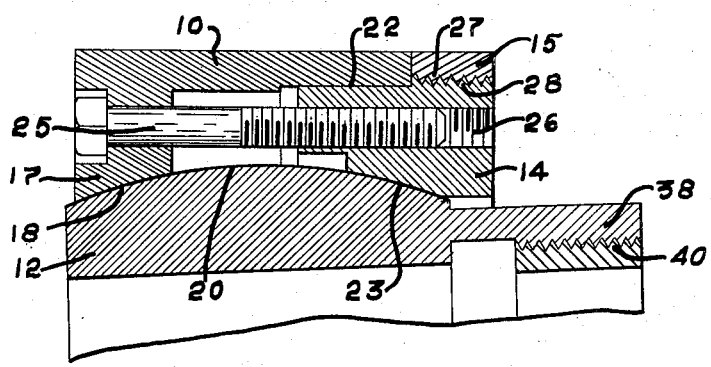
Fig. 5 is a detail sectional view corresponding generally with the disclosure of Fig. 2 but showing parts of the self alining bearing in different relative positions.

The stationary housing 10 is constituted as an annular member open at one of its ends, its right end as disclosed in Fig. 2 of the drawings, and provided at its opposite end with an interiorly extending annular flange 17. The annular flange 17 provides spaced apart, interiorly facing, arc shape bearing surfaces, four as shown, each represented 18, spaced at ninety degrees apart, and said annular flange 17 is cut away, as indicated at 19, at locations between adjacent arc shape bearing surfaces 18. In the disclosure as made, there are arc shape bearing surfaces 18 diametrically opposite each other, and also cut away portions 19 diametrically opposite each other. The arc shape bearing surfaces 18 are all in a single spherical surface and in a single plane in direction transversely of the longitudinal axis of the stationary housing 10.

The cage 12 is constituted as a hollowed out part-spherical member having externally facing, arc shape bearing surfaces, four as shown, each designated 20, spaced at ninety degrees apart, and the external surface of said cage is cut away, as denoted at 21, at locations between adjacent arc shape bearing surfaces 20. There is an arc shape bearing surface 20 engaged with each of the arc shape bearing surfaces 18, and said arc shape bearing surfaces 20 are all in a single spherical surface which is in fact the same spherical surface as that in which the arc shape bearing surfaces 18 are situated.

The retainer ring 14 for the cage 12 is constituted as an annular element within an annular space of the self alining bearing between a portion of the stationary housing 10 at and adjacent to its open end and an external portion of said cage in spaced relation to the interiorly extending annular flange 17. Stated otherwise, said retainer ring 14 and internally extending annular flange 17 are in alined relation in the direction of the longitudinal axis of the cage 12. An external surface 22 of the retainer ring 14 at an inner part thereof is of cylindrical configuration to be snugly slidable inwardly and outwardly along an internal cylindrical surface of the stationary housing 10 at and adjacent to its open end, and an internal surface of said retainer ring provides arc shape bearing surfaces 23. There is an arc shape bearing surface 23 engaged with each of the arc shape bearing surfaces 20, and said retainer ring 14 is cut away, as indicated at 24, at locations between adjacent arc shape bearing surfaces 23. Said arc shape bearing surfaces 23 are all in a single spherical surface as that in which the arc shape bearing surfaces 18 and 20 are situated.

Means for adjusting the retainer ring 14 inwardly and outwardly, toward and away from the internally extending annular flange 17, and for maintaining said retainer ring in position to cause the arc shape bearing surfaces 18, 20 and 23, 20, respectively, to be in engaged relation, consists of screw bolts 25 extending through and having their heads countersunk in said inwardly extending annular flange 17 and engaged in internally threaded openings 26 extending through the retainer ring. There are four screw bolts 25 in the disclosure as made, and said screw bolts are in alined relation to and equally spaced from the longitudinal axis of the cage 12.

The outer end portion of the retainer ring 14 includes an external thread 27, and the lock nut 15 has an internal thread 28 adapted to be turned down upon said external thread 27 until said lock nut 15 is engaged against the open, adjacent end of the stationary housing 10 to cause the retainer ring 14 to be secured against the possibility of turning movement. The lock nut 15 of course will be situated loosely on the retainer ring 14 until said retainer ring is adjusted to its intended and proper position, and after adjustment of said retainer ring is accomplished said lock nut will be turned down against the stationary housing 10.

It will be apparent that the inwardly extending annular flange 17 and the retainer ring 14 will, the one in cooperation with the other, maintain the cage 12 in the stationary housing 10 against the possibility of displacement of said cage from said stationary housing, and also it will be apparent that the cage 12 is mounted in the stationary housing 10 to be capable of rocking in any direction by reason of the engagement of the arc shape bearing surfaces 23 with the arc shape bearing surfaces 18 and 20.

The hollowed out part-spherical member or cage 12 is constructed at its interior to provide rectilinear slots, four as shown, each denoted 29, extending longitudinally of said hollowed out part-spherical member or cage, and there is a block 13 within each of said longitudinally extending slots 29. The blocks 13 are bearing elements of the self alining bearing, and the longitudinally extending slots 29 are disposed at ninety degrees apart, there being longitudinally extending slots 29, 29 disposed diametrically opposite each other in direction transversely of the hollowed out part-spherical member or cage 12. The longitudinally extending slots 29 are contiguous with a central passageway 30 through the hollowed out part-spherical member or cage 12 for freely receiving a shaft, such as 31, to be supported in the self alining bearing, and each longitudinally extending slot 29 is disposed radially of the longitudinal axis of said hollowed out part-spherical member or cage.

The longitudinally extending, radially disposed rectilinear slots 29 are all of the same size and configuration or construction. Each is bounded at its base or exterior by a flat camming surface 32 which is disposed in oblique relation to the longitudinal axis of the cage 12 and extends exteriorly of said cage in direction from the internally extending annular flange 17 toward the retainer ring 14, and at its opposite sides by spaced apart, parallel surfaces 33, 33 which are disposed radially of the cage 12. And, too, each flat camming surface 32 lies in a plane which is perpendicular to the planes including the spaced apart, parallel surfaces 33, 33 bounding the corresponding rectilinear slot 29.

The blocks or bearing elements 13 are of duplicate construction. Each is bounded at its exterior side by a flat camming surface 34, engaged against and slidable over the flat camming surface 32 bounding the base or exterior of the rectilinear slot 29 containing the corresponding block or bearing element, at its opposite sides by spaced apart, parallel surfaces 35, 35 engaged against and slidable over the spaced apart, parallel surfaces 33, 33 bounding the opposite sides of the corresponding rectilinear slot, and at its interior side by a part-cylindrical bearing surface 36 disposed longitudinally of the cage 12 and adapted to be engaged against a shaft, such as 31, when disposed in the self alining bearing. The construction and arrangement are such that the blocks or bearing elements 13 can be adjusted along the rectilinear slots 29 in one direction, toward the left in Fig. 2, to cause the part-cylindrical bearing surfaces 36 to be fitted to shafts such as 31 of smaller diameter, and in opposite direction, toward the right in said Fig. 2, to cause said part-cylindrical bearing surfaces to be fitted to shafts such as 31 of larger diameter. The construction and arrangement also are such that the part-cylindrical bearing surfaces can be made to lie in a single cylindrical surface concentric with the longitudinal axis of the cage 12 by adjustment of the blocks or bearing elements 13 to positions where all of said blocks or bearing elements are equi-distantly spaced from said longitudinal axis of said cage, independently of the diameter of a shaft, such as 31, to be supported in the self alining bearing; that is, independently of whether a shaft to be supported is of larger or smaller diameter. Each block or bearing element 13 tapers in direction from the retainer ring end of the self alining bearing toward the end thereof having the interiorly extending annular flange 17. The smaller end of each block or bearing element is bounded by a flat surface perpendicular to the longitudinal axis of the cage 12, as is also the adjacent end of said cage, and the larger end of each block or bearing element is bounded by a flat surface 37 perpendicular to said longitudinal axis of the cage.

The cage 12 includes a cylindrical extension 38 at the end thereof opposite the interiorly extending annular flange 17 which is in surrounding relation to the blocks or bearing elements and projects beyond the larger ends of said blocks or bearing elements at the corresponding end of the self alining bearing. Said cylindrical extension 38 includes an internal thread 39 which receives an external thread 40 upon the take-up ring 16 for the blocks or bearing elements 13. Said take-up ring is bounded at its inner end by an annular surface 41 disposed in a plane perpendicular to the longitudinal axis of the cage 12 and parallel and alined with and disposed outwardly of each of the flat surfaces 37. The construction and arrangement are such that the take-up ring 16 can be rotatably adjusted in the cylindrical extension 38 to cause all of the blocks or bearing elements 13 to be simultaneously forced inwardly of the cage 12 thus to cause said blocks or bearing elements to be concurrently adjusted interiorly of said cage to equal extent. Said take-up ring of course will preclude removal of the blocks or bearing elements 13 from the corresponding end of the cage 12.

Locking screw bolts for the blocks or bearing elements 13 are each indicated 42. Each block or bearing element includes an internally threaded transverse opening 43 alined with a slot 44 contiguous with and extending radially outwardly from a rectilinear slot 29. Each radial slot 44 is of dimension substantially equal to the diameter of each internally threaded opening 43 in direction circumferentially of the cage 12 and of greater dimension in the direction of the longitudinal axis of said cage. That is, each radial slot 44 is elongated in direction lengthwise of the cage 12. There is a locking screw bolt 42 for each block or bearing element 13. The locking screw bolts extend freely through the radial slots 44, are threaded into the transverse openings 43 and have their heads disposed in concavities 45 in the external surface of the cage 12. Said locking screw bolts when turned home obviously will fasten the blocks or bearing elements 13 in fixed relation to said cage. The locking screw bolts of course will be loose during adjustment of said blocks or bearing elements by manipulation of the take-up ring 16, and after adjustment of the blocks or bearing elements is accomplished, said locking screw bolts will be turned home. Evidently, said take-up ring and the locking screw bolts will in cooperation fixedly retain said blocks or bearing elements in any adjusted position to which set in the cage 12. The obvious reason for providing elongated radial slots such as 44 is to permit adjustment of the blocks or bearing elements longitudinally of the cage while the locking screw bolts 42 are assembled with said blocks or bearing elements and loosely disposed in said elongated radial slots.

Clearance openings 46, between adjacent rectilinear slots 29 and extending longitudinally through the cage 12 in contiguous relation to the central passageway 30, are for clearance of an expanding mandrel, or like entity, upon a shaft such as 31 to be situated in the self alining bearing.

Self alining bearings made according to the present invention ordinarily will be employed in pairs, or there may be more than two of the self alining bearings in alinement, to receive a shaft such as 31. The shaft will be situated within the cage of each of alined self alining bearings and supported by and engaged with the part-cylindrical bearing surfaces 36 of the blocks or bearing elements 13. The cage 12 and said blocks or bearing elements of each bearing are constituted as a unitary structure when the blocks or bearing elements after adjusted are secured in the rectilinear slots 29 by the take-up ring and the locking screw bolts in the manner as hereinbefore set forth. The part-spherical bearing surfaces 18 and 23 of the interiorly extending annular flange 17 and the retainer ring 14, respectively, engage the part-spherical bearing surfaces of the cage 12 at spaced apart locations in such manner that said cage is retained within the stationary housing 10 against the possibility of accidental displacement and so that the cage can have rocking movement in any direction relative to said stationary housing and retainer ring. The cage 12 and the unit with which said cage is joined, comprised as the stationary housing 10 and the retainer ring 14, are in fact connected in the same manner as are the joined elements of a universal joint so that said cage is mounted for swinging movement in any direction thus to permit the part-cylindrical bearing surfaces 36 to become readily and easily longitudinally alined with a shaft such as 31 in any self alining bearing made according to the principles of the invention.

The cut-away portions 19, 21 and 24 in the interiorly extending annular flange 17, cage 12 and retainer ring 14, respectively, are provided to the end that the cage can be removable from and insertable in the stationary housing while said retainer ring is in assembled position. To render the cage capable of removal it is merely necessary to rotate said cage ninety degrees from its position as in the drawings, and the cage can be replaced by reversal of the movements employed to remove it.

What is claimed is:

1. In combination, a hollowed out cage having a longitudinally extending central passageway and radial slots disposed outwardly of and in contiguous relation to said central passageway, circumferentially spaced bearing elements in said radial slots having interiorly facing bearing surfaces of part-cylindrical configuration disposed longitudinally of said cage, there being clearance openings between said bearing elements extending longitudinally through the cage in contiguous relation to said central passageway, and means for adjusting said bearing elements interiorly and exteriorly of said cage.

2. The combination as specified in claim 1 wherein each of said radial slots is bounded at its exterior by a camming surface and each of said bearing elements is bounded at its exterior side by a camming surface engaged against the camming surface at the exterior of a corresponding radial slot.

3. In combination, an annular member, a hollowed out cage mounted in said annular member for universal rocking movement and having a longitudinally extending central passageway and radial slots disposed outwardly of and in contiguous relation to said central passageway, circumferentially spaced bearing elements in said radial slots having interiorly facing bearing surfaces of part-cylindrical configuration disposed longitudinally of said cage, there being clearance openings between said bearing elements extending longitudinally through the cage in contiguous relation to said central passageway, and means for adjusting said bearing elements interiorly and exteriorly of said cage.

4. The combination as specified in claim 3 wherein each of said radial slots is bounded at its exterior by a camming surface and each of said bearing elements is bounded at its exterior side by a camming surface engaged against the camming surface at the exterior of a corresponding radial slot.

5. In combination, an annular member, a retaining element supported thereby, a hollowed out cage supported by said annular member and retaining element for universal rocking movement and having a longitudinally extending central passageway and radial slots disposed outwardly of and in contiguous relation to said central passageway, circumferentially spaced bearing elements in said radial slots having interiorly facing bearing surfaces of part-cylindrical configuration disposed longitudinally of said cage, there being clearance openings between said bearing elements extending longitudinally through the cage in contiguous relation to said central passageway, and means for adjusting said bearing elements interiorly and exteriorly of said cage.

6. The combination with an annular member and a retaining element adjustably, removably supported thereby, of a hollowed out cage removably supported by said annular member and retaining element for universal rocking movement and having a longitudinally extending central passageway and radial slots disposed outwardly of and in contiguous relation to said central passageway, circumferentially spaced bearing elements in said radial slots having interiorly facing bearing surfaces of part-cylindrical configuration disposed longitudinally of said cage and providing clearance openings between said bearing elements in contiguous relation to said central passageway, and means for adjusting said bearing elements interiorly and exteriorly of said cage.

7. The combination with an annular member and a hollowed out cage supported by said annular member for universal rocking movement and having a longitudinally extending central passageway and radial slots disposed outwardly of and in contiguous relation to said central passageway, circumferentially spaced bearing elements in said radial slots having interiorly facing bearing surfaces of part-cylindrical configuration disposed longitudinally of said cage to be situated upon a shaft in supporting relation thereto and providing clearance openings between said bearing elements in contiguous relation to said central passageway, and means for adjusting said bearing elements interiorly and exteriorly of said cage.

EWALD A. ARP.

REFERENCES CITED

The following references are of record in the file of this patent:

UNITED STATES PATENTS

| Number | Name | Date |
|---|---|---|
| 118,077 | Vitt | Aug. 15, 1871 |
| 130,373 | Howe | Aug. 13, 1872 |
| 936,286 | Amos | Oct. 12, 1909 |
| 1,219,978 | Masters | Mar. 20, 1917 |
| 1,304,832 | Weibull | May 27, 1919 |
| 1,356,561 | Sanford | Oct. 26, 1920 |
| 1,778,452 | Ernst | Oct. 14, 1930 |
| 2,382,773 | Chambers | Aug. 14, 1945 |
| 2,400,506 | Heim | May 21, 1946 |
| 2,448,341 | Yeomans | Aug. 31, 1948 |

FOREIGN PATENTS

| Number | Country | Date |
|---|---|---|
| 65,706 | Germany | Mar. 8, 1892 |
| 336,214 | Great Britain | Apr. 3, 1929 |